United States Patent Office 3,357,951
Patented Dec. 12, 1967

3,357,951
PROCESS FOR MAKING A RESINOUS
DENTIFRICE CLEANING AGENT
Frank S. Adams, Jr., Wyoming, Ohio, assignor to The
Procter & Gamble Company, Cincinnati, Ohio, a corporation of Ohio
No Drawing. Filed June 17, 1965, Ser. No. 464,836
2 Claims. (Cl. 260—59)

This invention relates to a process for preparing a particulate synthetic resin. More specifically, the invention involves the preparation of a phenol-formaldehyde resin for use as a cleaning agent in a dentifrice.

U.S. Patent 3,070,510, issued Dec. 25, 1962, to William E. Cooley et al. teaches dentifrice compositions which utilize finely divided, highly polymerized, thermo-setting resins as the essential cleaning and polishing agent. The resins of Cooley et al. find excellent use in a dentifrice because (1) they exhibit a high cleaning to abrasion ratio, i.e., they clean the teeth well without adversely affecting the dental enamel and (2) they are very compatible with advantageous dentifrice ionic ingredients such as stannous fluoride.

Cooley et al. disclose that phenol-formaldehyde resins are desirable from the standpoint of compatibility with ionic ingredients but they are generally not useful in a white dentifrice because "most of these resins [phenol-formaldehyde] are difficult to obtain in a color-free highly polymerized condition. . . ." Prior art processes for preparing phenol-formaldehyde resins provide products which range in color from deep yellow to dark brown. Since the cleaning or polishing agent constitutes a major component of a dentifrice, a dentifrice containing such prior art resins will necessarily be similarly colored. It is well known that the coloring employed in a dentifrice can have a significant effect on consumer acceptance, and that a white product is generally preferred. Measures heretofore taken to provide phenol-formaldehyde resins of light color have adversely affected the ionic compatibility or cleaning and polishing characteristics of the resin.

Accordingly, it is an object of this invention to provide a process for preparing light-colored particulate phenol-formaldehyde resins.

It is a further object of this invention to provide a process for preparing a light-colored particulate phenol-formaldehyde resin which is especially suitable as a cleaning agent, particularly in a dentifrice containing ionic ingredients.

These and other objects are achieved by a process for producing a particulate phenol-formaldehyde resin, which comprises (in broad terms): dissolving paraformaldehyde in a reaction mixture of molten phenol and citric acid; subjecting the reaction mixture to two controlled time-temperature levels; adding additional citric acid to the reaction mixture; refluxing the reaction mixture to cause polymerization; dehydrating the polymerized material; curing the dehydrated polymer in a vacuum; reducing the particle size of the resin thus obtained to a mean particle diameter ranging from about 5μ to about 40μ; additionally curing the particulate resin by further heat treatment.

A separate and distinct process for preparing a similar phenol-formaldehyde resin is disclosed in the U.S. patent application of Elwood LaFollette, filed concurrently herewith.

The conditions of the process of this invention particularly the temperature, time, and proportions of reactants in the various reactions, are important as is hereinafter more fully described, to achieve production of the desired product, i.e., a high-cleaning, low-abrasive, light-colored, ionically compatible, particulate resin.

The starting material (paraformaldehyde) is itself a polymer which is obtained by dehydrating an aqueous formaldehyde solution. Paraformaldehyde can be represented by the formula

$n>2$, but the exact degree of polymerization is not precisely known nor is it important for the purposes of this invention. Material which is commercially available simply under the name of "paraformaldehyde" is very suitable as the starting material. This material is obtainable as a dry powder, having been dried from the aqueous solution formed during its manufacture. Formaldehyde monomer could be used as the starting material but is difficult to obtain in a dry form. Non-aqueous ingredients are preferred because water must later be removed from the system. In any event, when paraformaldehyde dissolves in water, it becomes formaldehyde and will be referred to as such hereinafter where appropriate. Also, in computing molar ratios herein, paraformaldehyde or formaldehyde is considered to have a molecular weight of about 30.

In the first step of preparing the light-colored resinous cleaning agent, paraformaldehyde is dissolved in molten phenol (M.P.≈41° C.) containing citric acid as a catalyst at an initial reaction temperature ranging from about 75° C. to about 130° C. and preferably at a temperature of about 120° C. If the initial reaction temperature is higher than about 130° C., then an excessive loss of formaldehyde occurs whereas if the temperature is lower than about 75° C., it becomes very difficult to dissolve the paraformaldehyde. Citric acid is used instead of other acids in order to obtain a resinous product which is not only a good cleaning agent but is also light-colored.

The molar ratio of paraformaldehyde to phenol can range from about 1:1 to about 3:1 with 2.5:1 being preferred. The molar ratio of citric acid to phenol can range from about 0.005:1 to about 0.05:1 with 0.015:1 being preferred. These molar ratios are critical: A citric acid/phenol molar ratio greater than about 0.05:1 and a paraformaldehyde/phenol molar ratio greater than about 3:1 renders the reaction highly exothermic, difficult to control, and will cause premature polymerization thus "trapping" large amounts of unreacted material. Citric acid/phenol and paraformaldehyde/phenol molar ratios less than about 0.005:1 and 1:1 respectively renders the final product thermo-plastic rather than thermo-setting. Thermo-plastic resins are generally considered unsatisfactory as dental cleaning agents because of insufficient hardness and/or rigidity to clean and polish dental enamel.

This first step of the process takes from 20 minutes to 2 hours. As the paraformaldehyde dissolves, a translucent solution is formed. Mild agitation facilitates the dissolving process but a slight amount of paraformaldehyde will remain in suspension during the following steps.

The second step of the process involves two controlled time/temperature levels during which intermediate products are formed: (1) The reaction mixture is heated to a temperature ranging from about 60° C. to about 77° C. where it is held for a time ranging from about 50 minutes to about 200 minutes; (2) The reaction mixture is then heated to a temperature ranging from about 80° C. to about 104° C. for a time ranging from about 15 minutes to 60 minutes. Preferably, the first heating step is conducted at about 75° C. for about 100 minutes and the second heating step is conducted at about 82° C. for about 30 minutes. Moderate stirring is desirable during these reactions. The lower temperature during each level is the point at which the reaction mixture becomes too viscous to stir. Exceeding the upper temperature limits result in a loss of formaldehyde vapor during the first level and a loss of unreacted material during the second level. Heating for the indicated times in either case is necessary for the formation of proper intermediate products which are polymerized in succeeding steps to the desired resin.

In the third step of the process, the temperature of the partially reacted mixture from the second step is maintained at a level of from about 75° C. to about 108° C., preferably at about 104° C. Then additional citric acid is slowly added in an amount of from about 0.007 mole to about 0.07 mole per mole of original phenol, preferably 0.030 mole per mole of original phenol. This molar ratio is based on the amount of "original" phenol because some phenol has reacted at this stage and it is difficult to precisely measure the quantity of phenol still present in the reaction mixture.

This is an important step in the process as the desired polymerization starts to rapidly occur after the citric acid is added. A temperature of at least 75° C. is required in order to dissolve the citric acid but a temperature in excess of 108° C. results in a "runaway" reaction. Below the minimum citric acid/phenol mole ratio, the resultant product will not be hard enough to clean adequately in a dentifrice. If the maximum mole ratio is exceeded, the resultant product is too abrasive and dark colored for dentifrice purposes.

After the additional citric acid has been added, the reaction mixture is refluxed at from about 103° C. to about 115° C. for from 1 hour to about 3 hours, preferably at about 108° C. for about 2 hours. During this refluxing operation, the initial phenol-formaldehyde condensation polymerization is essentially completed. The operable temperature range for this step of the process is narrow and critical: below 103° C. the mixture will not reflux and thus the reaction will not proceed at a practical rate; above 115° C. the mixture will easily scorch. As this step proceeds to completion, the reaction mixture becomes opaline (milky) in appearance and the viscosity increases. Maintaining the proper conditions during this step is especially important for the production of a resin that is light-colored.

After refluxing for 1 hour to 3 hours, and the mixture has become opalescent, the condensers of the refluxing apparatus are removed, thereby venting the reaction mixture to the atmosphere. Heating is continued, however, at between 103° C. and 150 °C., preferably at 120° C. for about 45 minutes, in order to drive off water from the reaction mixture (water is a by-product of the polymerization reaction); some unreacted phenol and formaldehyde are also distilled off along with the water. When the mixture becomes so viscous that stirring is no longer possible, this step of the process is completed.

The mixture is then removed from the reaction vessel and preferably placed in shallow pans. At this point the polymer is not yet cross-linked or highly cured and therefore tends to be sticky or tacky in nature. For this reason, pans lined with "Teflon" or a similar material are desirable to facilitate handling. The pans are placed in a vacuum oven where further dehydration, polymerization, and curing as well as cross-linking of the polymer occurs.

The vacuum in the oven is maintained at 20 inches to 30 inches of Hg while the temperature can range from about 70° C. to about 132° C., preferably about 80° C. This treatment is preferably carried out for a period of time of about 170 hours.

The next step of the process involves size reduction of the resin to a mean particle diameter ranging from about $5\mu$ to about $40\mu$; preferably, few particles larger than about $20\mu$ are allowed to remain, i.e., not more than 5%. Larger particles than about $20\mu$ tend to feel gritty in the mouth and to stick between teeth. Small particles, i.e., less than about $5\mu$, are relatively ineffective in cleaning teeth. This step can be carried out by use of any conventional size-reduction equipment such as a ball mill, impact mill, pulverizer, or the like taking due care to avoid overheating of the resin, i.e., heating above 50° C.

After size reduction has been effected, additional curing is performed on the resin particles; atmospheric heating at a temperature ranging from about 110° C. to about 130° C., preferably at about 120° C. for up to 20 hours at this point renders the product harder and therefore a better cleaning agent is obtained.

Thus, in more precise terms, the process of this invention comprises: (1) dissolving paraformaldehyde in a reaction mixture of molten phenol and citric acid at a temperature ranging from about 75° C. to about 130° C., the molar ratio of paraformaldehyde to phenol being from about 1:1 to about 3:1, the molar ratio of citric acid to phenol being from about 0.005:1 to about 0.05:1; (2) subjecting the reaction mixture to a temperature ranging from about 60° C. to about 77° C. for about 50 minutes to about 200 minutes, then raising the temperature to a range of from about 80° C. to about 104° C. for a period of about 15 minutes to about 60 minutes; (3) after said period, maintaining the temperature of the reaction mixture at a level of from about 75° C. to about 108° C., and adding thereto additional citric acid in an amount of from about 0.007 mole to about 0.07 mole per mole of original phenol; (4) refluxing the reaction mixture for about 1 hour to about 3 hours at a temperature ranging from about 103° C. to about 115° C. to polymerize the material; (5) dehydrating the polymerized material by heating at a temperature of from about 103° C. to about 150° C., preferably for about 45 minutes; (6) curing the dehydrated polymer by heating in a vacuum at a temperature ranging from about 70° C. to about 132° C., preferably for about 170 hours; (7) reducing the size of the resin thus obtained to a mean particle diameter ranging from about $5\mu$ to about $40\mu$; (8) additionally curing the particulate resin at a temperature ranging from about 110° C. to about 130° C. for up to 20 hours.

Phenol-formaldehyde resins prepared by the above-described process are light-colored, have a high ionic compatibility, and are excellent dental cleaning agents, all of which properties are illustrated in the following example.

*Example 1*

1500 grams of phenol (Dow Chemical Co., reagent grade) were placed into the spherical lower section of a five liter reaction flask and were melted (M.P.≈41° C.). 50 grams of citric acid crystals (Baker Chemical Co., Monohydrate) were added to the molten phenol. The lower section of the reaction vessel was then attached to a four-necked reaction flask top (glass stirring rod and blade in first neck, mercury thermometer in second, water-cooled condenser topped with acetone-cooled condenser in third, glass stopper in fourth neck). Heat was applied to the flask by means of a heating mantle; moderate agitation was effected with the stirring blade for ten minutes while the temperature rose to 120° C. This temperature was then maintained for an additional ten minutes with moderate stirring.

1287 grams of paraformaldehyde (Celanese Corp., reagent grade) were then added to the reaction mixture; the temperature dropped to 74° C. Additional heat was supplied to raise the temperature to 75° C. and the mixture was gently stirred for 100 minutes. The paraformaldehyde gradually dissolved but a few white particles could still be seen in the syrupy, clear reaction mixture. The temperature was then raised to 82° C. and stirring continued for thirty minutes.

The temperature was then raised to 104° C. and 100 grams of citric acid was added during a seven to eight minute period. The mixture was refluxed at 108° C. for 30 minutes at which time the last white particles of paraformaldehyde dissolved and the mixture became more fluid and opalescent. Refluxing was continued at 108° C. for an additional 90 minutes after which time the condensers were removed. Heating, to effect dehydration, was continued for 45 minutes at 120° C. As dehydration occurred, the mixture became more and more viscous until at the end of 45 minutes it could no longer be stirred.

The mixture was then removed from the flask and placed in a shallow "Teflon"-lined pan. The pan was placed in a vacuum oven (24–26 inches of Hg) and the oven temperature was maintained at 75° C.–85° C. for 168 hours.

The resin was then size-reduced in a Mikro Pulverizer (2 passes, fine screen) using Dry Ice to avoid excess heat. The resin was then further size-reduced in a ball mill for about 300 hours until the particle size ranged from $5\mu$ to $40\mu$, as observed in a microscope.

The resin particles were then placed on trays and heated in an oven for 18 hours at 120° C.

The final product, a highly polymerized, cross-linked, thermo-setting, particulate resinous cleaning agent, was very light in color (not pure white but easily characterized as "off-white") and was extremely effective as a dentifrice cleaning agent as shown in the following tests.

*Cleaning grade*

White nylon blocks having a surface measuring 10 mm. x 12 mm. were ground smooth, washed and dried. One drop of ethyl acetate was placed on the level, dry, dust-free surface and allowed to spread. Then three drops of a mixture consisting of two parts ethyl acetate and one part of high gloss black lacquer were applied. In one minute the lacquer dried to a tacky surface and drying was completed in three ten-minute stages. The blocks were covered with metal cans for the first stage; the cans were tilted to allow partial access of room air currents during the second stage, and the cans were removed for the third stage. Such a drying gives uniform and reproducible films. The blocks were heated for twenty minutes, twelve inches below a 375 watt heat lamp, and then cooled. The blocks were prepared in sets of 200 to 300. The blocks were inserted in slurries of cleaning agents to be tested and mechanically brushed by toothbrushes moving back and forth across the face of the block under uniform pressure. The slurries of test materials were of equal viscosity (70 cps. at room temperature) rather than of equal weights in order to approximate more closely the conditions which would be encountered when using the cleaning material being tested in a toothpaste. The blocks were brushed 3000 double strokes. Reflectance measurements were taken with a Photovolt Reflectometer on the brushed surface.

The above test was performed using the resin prepared in Example I as one test material and a standard dental cleaning agent, calcium pyrophosphate ($Ca_2P_2O_7$), as the other test material. The reflectance measurement, read directly from the Reflectometer, was 63 units for the phenolformaldehyde resin compared to 67 units for the $Ca_2P_2O_7$. This means that the resin was nearly identical to standard calcium pyrophosphate in terms of cleaning ability and dental abrasion.

*Compatibility test*

A solution was prepared which consisted of 250 parts of glycerine, 250 parts of water and 4 parts of stannous fluoride. To 25 parts of this solution was added 20 parts of the cleaning agent to be tested and 5 parts of water. To a blank (or control) sample 25 parts of water free from cleaning agent was added to 25 parts of the solution. The air in the samples was replaced with nitrogen before capping tightly to prevent oxidation of the stannous ions. The samples were then stored at room temperature. The presence of glycerine retards the natural hydrolysis of the stannous ions and thus permits a better measure of the rate of absorption of the ions by the cleaning agent. At intervals the concentration of the stannous ions and fluoride ions was determined iodimetrically. The compatibility was measured in terms of percent stannous ions and percent fluoride ions remaining in the sample (relative to the blank sample) at the end of 7 days.

The above test was performed using the resin prepared in Example I as one test material and a standard dentifrice cleaning agent, calcium pyrophosphate, as another test material. The results of these tests are shown below.

IONIC COMPATIBILITY SCORES

| Test | Stannous ion, percent remaining after seven days | Fluoride ion, percent remaining after seven days |
|---|---|---|
| $Ca_2P_2O_7$ (Standard) | 2 | 30 |
| Resin (prepared in Example I) | 30 | 68 |

It can be seen from the above data that the phenol-formaldehyde resin prepared by the process of this invention exhibits a high ionic compatibility as compared to a standard dentifrice cleaning agent.

Thus, the resins prepared by the process of this invention are useful as a dentifrice cleaning agent and are especially useful in combination with ionic ingredients. Further, they are not dark colored as are previously known phenol-formaldehyde cleaning agents and are therefore readily adaptable for use in a desirable white or other light colored dentifrice.

What is claimed is:

1. A process for preparing a light-colored particulate phenol-formaldehyde resinous dentifrice cleaning agent, which comprises:
   (1) dissolving paraformaldehyde in a reaction mixture of molten phenol and citric acid at a temperature ranging from about 75° C. to about 130° C., the molar ratio of paraformaldehyde to phenol being from about 1:1 to about 3:1, the molar ratio of citric acid to phenol being from about 0.005:1 to about 0.05:1;
   (2) subjecting the reaction mixture to a temperature ranging from about 60° C. to about 77° C. for about 50 minutes to about 200 minutes, then raising the temperature to a range of from about 80° C. to about 104° C. for a period of about 15 minutes to about 60 minutes;
   (3) after said period, maintaining the temperature of the reaction mixture at a level of from about 75° C. to about 108° C., and adding thereto additional citric acid in an amount of from about 0.007 mole to about 0.07 mole per mole of original phenol;
   (4) refluxing the reaction mixture for about 1 hour to about 3 hours at a temperature ranging from about 103° C. to about 115° C. to polymerize the material;
   (5) dehydrating the polymerized material by heating at a temperature of from about 103° C. to about 150° C.;
   (6) curing the dehydrated polymer by heating in a vacuum at a temperature ranging from about 70° C. to about 132° C.;
   (7) reducing the size of the resin thus obtained to a mean particle diameter ranging from about $5\mu$ to about $40\mu$;
   (8) additionally curing the particulate resin by heating at a temperature ranging from about 110° C. to about 130° C.

2. A process for preparing a light-colored particulate phenol-formaldehyde resinous dentifrice cleaning agent, which comprises:
   (1) dissolving paraformaldehyde in a reaction mixture of phenol and citric acid at a temperature of 120° C., the molar ratio of paraformaldehyde to phenol being 2.5:1, the molar ratio of citric acid to phenol being 0.015:1;
   (2) subjecting the reaction mixture to a temperature of 75° C. for 100 minutes and then raising the temperature to 82° C., for a period of 30 minutes;

(3) after said period, maintaining the temperature of the reaction mixture to 104° C., and adding thereto 0.030 mole of citric acid per mole of original phenol;
(4) refluxing the reaction mixture at 108° C. for 2 hours to polymerize the material;
(5) dehydrating the polymerized material by heating at 120° C. for 45 minutes;
(6) curing the dehydrated polymer by heating in a vacuum at 80° C. for 170 hours;
(7) reducing the size of the resin thus obtained to a mean particle diameter ranging from about 5μ to 40μ;
(8) additionally curing the particulate resin by heating at 120° C. for 18 hours.

References Cited

UNITED STATES PATENTS

| | | | |
|---|---|---|---|
| 1,989,951 | 10/1933 | Sussenguth | 360—50 |
| 2,138,795 | 11/1938 | Schmidt | 260—4 |
| 3,070,510 | 12/1962 | Cooley et al. | 167—93 |
| 3,251,800 | 5/1966 | Cooley et al. | 260—39 |

OTHER REFERENCES

Ellis, Chemistry of Synthetic Resins, vol. I, pp. 349, 354.

Martin, Chemistry of Phenolic Resins, 1956, p. 97.

WILLIAM H. SHORT, *Primary Examiner.*

H. E. SCHAIN, *Assistant Examiner.*